(12) United States Patent
Syrjärinne et al.

(10) Patent No.: US 10,149,195 B2
(45) Date of Patent: Dec. 4, 2018

(54) HANDLING WIRELESS FINGERPRINT DATA

(71) Applicant: HERE GLOBAL B.V., Eindhoven (NL)

(72) Inventors: Jari Syrjärinne, Tampere (FI); Pavel Ivanov, Tampere (FI); Muhammad Irshan Khan, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/315,568

(22) PCT Filed: Jun. 2, 2014

(86) PCT No.: PCT/EP2014/061306
§ 371 (c)(1),
(2) Date: Dec. 1, 2016

(87) PCT Pub. No.: WO2015/185077
PCT Pub. Date: Dec. 10, 2015

(65) Prior Publication Data
US 2017/0238205 A1 Aug. 17, 2017

(51) Int. Cl.
*H04W 24/00* (2009.01)
*H04W 28/02* (2009.01)
(Continued)

(52) U.S. Cl.
CPC ........ *H04W 28/0263* (2013.01); *H04B 17/27* (2015.01); *H04B 17/318* (2015.01);
(Continued)

(58) Field of Classification Search
CPC . H04W 28/0263; H04W 8/005; H04W 64/00; H04W 72/121; H04W 24/08; H04B 17/318
See application file for complete search history.

(56) References Cited

U.S. PATENT DOCUMENTS 6,269,246 B1 7/2001 Rao et al.
8,830,909 B1* 9/2014 Octeau .................. H04W 4/025
370/328
(Continued)

OTHER PUBLICATIONS

International Preliminary Report on Patentability from International Application No. PCT/EP2014/061306 dated Dec. 6, 2016.
(Continued)

*Primary Examiner* — Stephen M D Agosta
(74) *Attorney, Agent, or Firm* — Alston & Bird LLP

(57) ABSTRACT

Apparatus is configured to scan for radio signals transmitted by at least first and second transmitting devices; for each radio signal identified in the scan, receive an identifier relating to the originating transmitting device from the radio signal; use the identifier and/or parameters of a radio signal received from the first transmitting device and the identifier and/or parameters of a radio signal received from the second transmitting device to detect whether the first and second transmitting devices are co-located; and in response to detecting that the first and second transmitting devices are co-located: create a group for the transmitting devices that are identified as being co-located; create wireless fingerprint data for the group as a whole and refrain from creating wireless fingerprint data for every transmitting device of the group; and cause transmission of the wireless fingerprint data to a remote server.

14 Claims, 6 Drawing Sheets

(51) Int. Cl.
  *H04W 4/02*     (2018.01)
  *H04W 4/08*     (2009.01)
  *H04W 64/00*    (2009.01)
  *H04B 17/318*   (2015.01)
  *H04W 8/00*     (2009.01)
  *H04W 72/12*    (2009.01)
  *H04B 17/27*    (2015.01)
  *H04W 24/08*    (2009.01)

(52) U.S. Cl.
  CPC .............. *H04W 4/02* (2013.01); *H04W 4/08* (2013.01); *H04W 8/005* (2013.01); *H04W 64/00* (2013.01); *H04W 64/003* (2013.01); *H04W 72/121* (2013.01); *H04W 24/08* (2013.01)

(56) References Cited

U.S. PATENT DOCUMENTS

2011/0039517 A1   2/2011   Wigren et al.
2012/0052875 A1   3/2012   Kangas et al.
2014/0051439 A1   2/2014   Brownworth

OTHER PUBLICATIONS

International Search Report and Written Opinion from International Application No. PCT/EP2014/061306 dated Feb. 4, 2015.

\* cited by examiner

HANDLING WIRELESS FINGERPRINT DATA

FIELD OF THE INVENTION

The invention relates to the field of radiomap based positioning and in particular to handling wireless fingerprint data for use in radiomap based positioning.

BACKGROUND TO THE INVENTION

Modern global cellular and non-cellular positioning technologies are based on generating large global databases containing information on cellular and non-cellular communication network nodes, e.g. cellular radio network base stations (BSs) or non-cellular radio network, e.g. WLAN (Wi-Fi) access points (APs), and their signals. All such transmitting network nodes can be termed access points or APs. The information may originate entirely or partially from users of these positioning technologies using their mobile terminals acting as data collectors.

The data provided by these data collecting mobile terminals is typically in the form of "fingerprints", which contain radio measurement values, i.e. measurements of radio parameters. A fingerprint also comprises, for the radio measurement values from an access point (AP) location information, e.g. obtained based on received satellite signals of a global navigation satellite system (GNSS), and communication network node identification information identifying a node that is observed by the collector and being associated with the radio measurement values pertaining to that node.

This data is then transferred to a server or cloud, where the data (usually of a multitude of users) may be collected and where a radiomap for positioning purposes may be generated (or updated) based on the data.

In the end, this radiomap may be used for estimating a position, e.g. the position of a mobile terminal. This may function in two modes. The first mode is the terminal-assisted mode, in which the mobile terminal performs the measurements of radio parameters to obtain radio measurement values via a cellular and/or non-cellular air interface, provides the measurements to a remote server, which in turn, based on the radiomap, determines and provides the position estimate back to the mobile terminal. The second mode is the terminal-based mode, in which the mobile terminal has a local copy of the radiomap (or only a subset of a global radiomap), e.g. downloaded by the mobile terminal from a remote server or pre-installed in the mobile terminal.

The actual position estimate may then be obtained based on the radiomap or parts thereof by obtaining identification information of nodes that are observed at the respective position and/or obtaining radio measurement values at that position.

Based on the radiomap or parts thereof, properties of a respective node may be modelled. The model may then be used for position estimation. For instance, the coverage area of nodes may be modelled. For each node that is observed at the respective position, the modelled coverage area may be considered and the position estimate may then be the centre of the area of intersection of the coverage area models of all observed nodes. As an alternative to coverage area models (or as an addition allowing more accurate position estimation), also radio channel models (aka radio propagation models) for communication network nodes may serve as a basis for determining a position based on, for instance, a received signal strength and/or a path loss measured at the respective position. A radio channel model may for instance describe how the power of a signal emitted by a communication network node decays with increasing distance from the communication network, for instance under consideration of further parameters as for instance the radio transmission frequency. Now, if radio channel model information is available for an identified communication network node, for instance if a strength of a signal from this communication network node as received at the respective position (or, as another example, the path loss experienced by this signal) has been measured at that position, an estimate of the distance towards the communication network node can be determined and exploited (e.g. among further information) to determine a position estimate.

This specification is concerned primarily with the collection, processing and transmission of data by mobile terminals for use in creating a radiomap at a server or in the cloud.

The collection and transmission of data by mobile terminals presents some challenges. In addition to the use of transceiver and battery resources in performing scans for transmissions by access points and measuring those transmissions, the resulting data occupies memory space when stored and utilises bandwidth when transmitted to a server or cloud.

It is an aim of the invention to reduce the amount of data needed to be stored and transmitted in collection of data that can be used in creating radiomaps.

SUMMARY OF THE INVENTION

A first aspect of the invention provides apparatus configured to:
  scan for radio signals transmitted by at least first and second transmitting devices;
  for each radio signal identified in the scan, receive an identifier relating to the originating transmitting device from the radio signal;
  use the identifier and/or parameters of a radio signal received from the first transmitting device and the identifier and/or parameters of a radio signal received from the second transmitting device to detect whether the first and second transmitting devices are co-located; and
  in response to detecting that the first and second transmitting devices are co-located:
    create a group for the transmitting devices that are identified as being co-located;
    create wireless fingerprint data for the group as a whole and refrain from creating wireless fingerprint data for every transmitting device of the group; and
    cause transmission of the wireless fingerprint data to a remote server.

The apparatus may be configured to use the identifier and the parameters of the radio signal received from the first transmitting device and to use the identifier and the parameters of the radio signal received from the second transmitting device to detect whether the first and second transmitting devices are co-located.

The apparatus may be configured to use some information relating to the first transmitting device and some information relating to the second transmitting device to determine a candidate group for the first and second transmission devices and to use other information relating to the first transmitting device and other information relating to the second transmitting device to confirm the candidate group and thus detect that the first and second transmitting devices are co-located.

The wireless fingerprint data for the group may comprise a group identifier and wherein the apparatus may be configured to store group identification information comprising the group identifier and identifiers for transmitting devices that are part of the group.

The apparatus may be configured to cause transmission of the group identification information comprising the group identifier and identifiers for transmitting devices that are part of the group.

The apparatus may be configured to use group identification information stored in the apparatus to create wireless fingerprint data for a group identified by the group identification information. Here, the apparatus may be configured to receive group identification information and to store the received group identification information in the apparatus.

The wireless fingerprint data may comprise radio parameter information that is generated by averaging measured radio parameter information relating to the transmitting devices that are part of the group.

The parameter of the received radio signal may be received signal strength.

The apparatus may be configured to determine that third and fourth transmission devices may be co-located and in response to send information relating to the third and fourth transmission devices to a remote server for verification as to whether the third and fourth transmission devices are co-located.

A second aspect of the invention provides apparatus, the apparatus having at least one processor and at least one memory having computer-readable code stored thereon which when executed controls the at least one processor to:
  cause scanning for radio signals transmitted by at least first and second transmitting devices;
  for each radio signal identified in the scan, receive an identifier relating to the originating transmitting device from the radio signal;
  use the identifier and/or parameters of a radio signal received from the first transmitting device and the identifier and/or parameters of a radio signal received from the second transmitting device to detect whether the first and second transmitting devices are co-located; and
  in response to detecting that the first and second transmitting devices are co-located:
    create a group for the transmitting devices that are identified as being co-located;
    create wireless fingerprint data for the group as a whole and refrain from creating wireless fingerprint data for every transmitting device of the group; and
    cause transmission of the wireless fingerprint data to a remote server.

The computer-readable code when executed may control the at least one processor to use the identifier and the parameters of the radio signal received from the first transmitting device and to use the identifier and the parameters of the radio signal received from the second transmitting device to detect whether the first and second transmitting devices are co-located.

The computer-readable code when executed may control the at least one processor to use some information relating to the first transmitting device and some information relating to the second transmitting device to determine a candidate group for the first and second transmission devices and to use other information relating to the first transmitting device and other information relating to the second transmitting device to confirm the candidate group and thus detect that the first and second transmitting devices are co-located.

The wireless fingerprint data for the group may comprise a group identifier and the computer-readable code when executed may control the at least one processor to store group identification information comprising the group identifier and identifiers for transmitting devices that are part of the group.

The computer-readable code when executed may control the at least one processor to cause transmission of the group identification information comprising the group identifier and identifiers for transmitting devices that are part of the group.

The computer-readable code when executed may control the at least one processor to use group identification information stored in the apparatus to create wireless fingerprint data for a group identified by the group identification information.

The computer-readable code when executed may control the at least one processor to receive the group identification information and to store the received group identification information in the apparatus.

The wireless fingerprint data may comprise radio parameter information that is generated by averaging measured radio parameter information relating to the transmitting devices that are part of the group.

The parameter of the received radio signal may be received signal strength.

The computer-readable code when executed may control the at least one processor to determine that third and fourth transmission devices may be co-located and in response to send information relating to the third and fourth transmission devices to a remote server for verification as to whether the third and fourth transmission devices are co-located.

A third aspect of the invention provides a method comprising:
  scanning for radio signals transmitted by at least first and second transmitting devices;
  for each radio signal identified in the scan, receiving an identifier relating to the originating transmitting device from the radio signal;
  using the identifier and/or parameters of a radio signal received from the first transmitting device and the identifier and/or parameters of a radio signal received from the second transmitting device to detect whether the first and second transmitting devices are co-located; and
  in response to detecting that the first and second transmitting devices are co-located:
    creating a group for the transmitting devices that are identified as being co-located;
    creating wireless fingerprint data for the group as a whole and refrain from creating wireless fingerprint data for every transmitting device of the group; and
    causing transmission of the wireless fingerprint data to a remote server.

The method may comprise using the identifier and the parameters of the radio signal received from the first transmitting device and using the identifier and the parameters of the radio signal received from the second transmitting device to detect whether the first and second transmitting devices are co-located.

The method may comprise using some information relating to the first transmitting device and some information relating to the second transmitting device to determine a candidate group for the first and second transmission devices and using other information relating to the first transmitting device and other information relating to the second transmitting device to confirm the candidate group and thus detect that the first and second transmitting devices are co-located.

The wireless fingerprint data for the group may comprise a group identifier and the method may comprise storing group identification information comprising the group identifier and identifiers for transmitting devices that are part of the group.

The method may comprise causing transmission of the group identification information comprising the group identifier and identifiers for transmitting devices that are part of the group.

The method may comprise using group identification information stored in the apparatus to create wireless fingerprint data for a group identified by the group identification information. The method may comprise receiving group identification information and storing the received group identification information.

The wireless fingerprint data may comprise radio parameter information that is generated by averaging measured radio parameter information relating to the transmitting devices that are part of the group.

The parameter of the received radio signal may be received signal strength.

The method may comprise determining that third and fourth transmission devices may be co-located and in response sending information relating to the third and fourth transmission devices to a remote server for verification as to whether the third and fourth transmission devices are co-located.

Another aspect of the invention provides a computer program comprising machine readable instructions that when executed by computing apparatus causes it to perform any method above.

A fourth aspect of the invention provides a non-transitory computer-readable storage medium having stored thereon computer-readable code, which, when executed by computing apparatus, causes the computing apparatus to perform a method comprising:

scanning for radio signals transmitted by at least first and second transmitting devices;

for each radio signal identified in the scan, receiving an identifier relating to the originating transmitting device from the radio signal;

using the identifier and/or parameters of a radio signal received from the first transmitting device and the identifier and/or parameters of a radio signal received from the second transmitting device to detect whether the first and second transmitting devices are co-located; and in response to detecting that the first and second transmitting devices are co-located:

creating a group for the transmitting devices that are identified as being co-located;

creating wireless fingerprint data for the group as a whole and refrain from creating wireless fingerprint data for every transmitting device of the group; and causing transmission of the wireless fingerprint data to a remote server.

The computer-readable code when executed may cause the computing apparatus to perform: using the identifier and the parameters of the radio signal received from the first transmitting device and using the identifier and the parameters of the radio signal received from the second transmitting device to detect whether the first and second transmitting devices are co-located.

The computer-readable code when executed may cause the computing apparatus to perform: using some information relating to the first transmitting device and some information relating to the second transmitting device to determine a candidate group for the first and second transmission devices and using other information relating to the first transmitting device and other information relating to the second transmitting device to confirm the candidate group and thus detect that the first and second transmitting devices are co-located.

The wireless fingerprint data for the group may comprise a group identifier and the computer-readable code when executed may cause the computing apparatus to perform: storing group identification information comprising the group identifier and identifiers for transmitting devices that are part of the group.

The computer-readable code when executed may cause the computing apparatus to perform: causing transmission of the group identification information comprising the group identifier and identifiers for transmitting devices that are part of the group.

The computer-readable code when executed may cause the computing apparatus to perform: using group identification information stored in the apparatus to create wireless fingerprint data for a group identified by the group identification information.

The computer-readable code when executed may cause the computing apparatus to perform: receiving group identification information and storing the received group identification information.

The wireless fingerprint data may comprise radio parameter information that is generated by averaging measured radio parameter information relating to the transmitting devices that are part of the group.

The parameter of the received radio signal may be received signal strength.

The computer-readable code when executed may cause the computing apparatus to perform: determining that third and fourth transmission devices may be co-located and in response sending information relating to the third and fourth transmission devices to a remote server for verification as to whether the third and fourth transmission devices are co-located.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

Embodiments of the invention will now be described, by way of example only, with reference to the accompanying figures, in which.

DETAILED DESCRIPTION OF EMBODIMENTS OF THE INVENTION

In brief, embodiments of the invention involve a mobile terminal processing data obtained from the mobile terminal scanning for transmissions of access points to identify access points that are co-located, that is where the access points have the same physical location, and consolidating fingerprint data for such access points. Co-located access points typically are part of a common multiple input multiple output (MIMO) device, such as an IEEE 802.11n router. Consolidation occurs by allocating the co-located access points to a MIMO group, and providing fingerprint data for the group as a whole instead of for each of the members of the group individually. This can allow radiomaps to be created in which the radiomaps have the same accuracy as they would in the corresponding arrangement in which fingerprints were provided for each access point instead of for MIMO groups, however without requiring as much memory space to store the fingerprint data nor as much bandwidth to transmit the fingerprint data.

At the server or cloud side, there is a corresponding saving in memory required to store the received data and bandwidth needed to receive the data. However, the quality of the information is not reduced and so the resulting radiomaps are of the same accuracy and usefulness.

In the embodiments, the mobile terminal uses identifiers of the APs, as determined from the transmissions from the APs, to identify candidate MIMO groups. Candidate MIMO groups are then verified using radio parameters of signals received from the APs and optionally other data (e.g. scan time data). For verified MIMO groups, fingerprint data is consolidated. For MIMO groups that cannot be verified but cannot be ruled out as not being valid MIMO groups, fingerprint data is sent to a server or the cloud for further analysis. This can provide reliable detection of access points that do form part of actual MIMO groups whilst requiring relatively little data processing.

The radio measurement values may for instance contain a received signal strength (RSS), e.g. measured in dBm, for instance with a reference value of 1 mW, with or without the Doppler effect being averaged out therein, and/or path losses and/or timing measurement values like timing advance (TA), round-trip time (RTT) and/or propagation delay, and/or an angle of arrival (AOA). Boolean radio measurement values are also possible, e.g. a radio measurement value that indicates whether or not a specific location lies within the coverage area of a specific communication network node.

Figure 1:
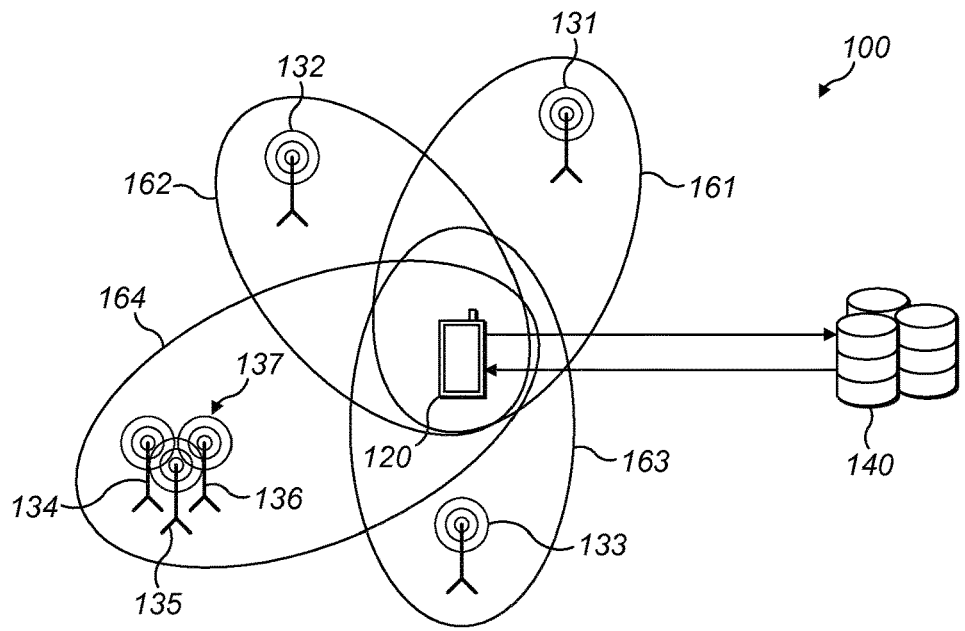
FIG. 1 is a schematic illustration of a positioning system in which example embodiments of the present invention may be employed.

FIG. 1 shows a positioning system 100, in which embodiments of the present invention may be employed. In FIG. 1, mobile terminal 120 is capable of identifying nodes 131, 132 and 133 of one or more communication networks. Each of nodes 131, 132 and 133 constitutes an access point and provides radio coverage in a respective coverage area 161, 162 and 163. As just one possible example, the node 131 may be a WLAN AP, node 132 may be a BS of an LTE cellular network and node 133 may be a UMTS Node B. Each of the nodes 131, 132 and 133 transmits node identification information identifying the respective node. The identification information may comprise an identifier. Namely, WLAN AP 131 may transmit a MAC identifier, BS 132 an LTE Cell Identity and UMTS Node B 133 transmits a UTRAN Cell ID (UC-ID).

A MIMO node 137 comprises three access points 134-136. The nodes 134-136 form part of the same MIMO device, for instance an 802.11n router device. Each access point 134-136 may be associated with a respective antenna. The antennas may be separated by a relatively small distance (typically no more than a few tens of centimeters) and thus the access points 134-136 are co-located. The MIMO node 137 provides radio coverage in a coverage area 164. This can be considered to be a common coverage area 164, although in actuality each access point 134-136 has its own coverage area and there may be slight differences between them because of the slightly different locations of the antennas and because of the slightly different environments in which the different antennas are located. Each access point 134-136 in the MIMO node 137 transmits a different identifier, for instance MAC identifier or MAC address.

Mobile terminal 120 comprises several communication interfaces. It inter alia comprises a WLAN interface, an LTE interface and a UMTS interface. By means of these interfaces, the mobile terminal 120 is capable of receiving the MAC identifier, the LTE Cell Identity and the UC-ID.

At server 140 of system 100, radiomap datasets (RMDSs) are stored. Each RMDS comprises radio measurement values of a radio parameter. The radio measurement values have been previously measured by mobile terminals such as mobile terminal 120 and have then been reported to server 140.

When a mobile terminal (such as mobile terminal 120) does not have GNSS capabilities, does not want to use these capabilities or demands position information in addition to position information obtained by means of GNSS signals, a positioning request may be provided to server 140. Server 140 may then calculate coverage area and/or radio channel models for each of the nodes 131, 132 and 133 or only some of these nodes based on one or several of the stored RMDSs. Alternatively, such models may have been calculated previously and may be stored at the server 140 so that they may be ready for access when a mobile terminal 120 request a position estimate. These models may also be stored in the form of RMDSs.

The server that calculates the models and the server to which actual radio measurement values have been provided for generating RMDSs may be different entities.

Figure 2:
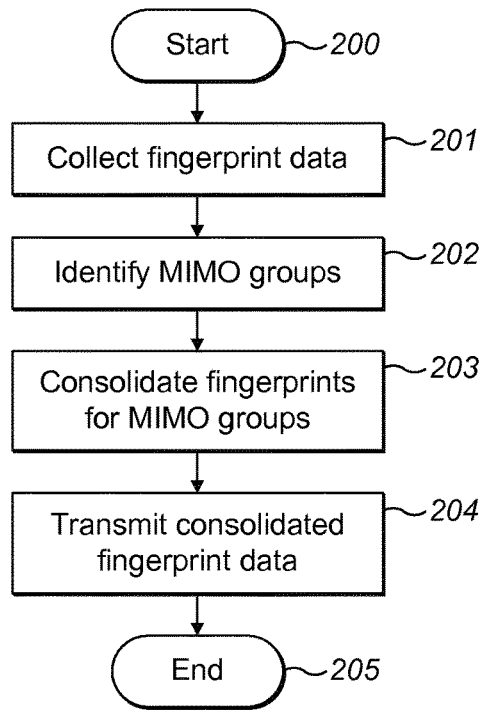
FIG. 2 is a flow chart illustrating operation of a mobile terminal of the FIG. 1 system according to various embodiments.

FIG. 2 is a flow chart illustrating a method according to the embodiments of the invention. The method steps of the flow chart of FIG. 2 are performed by an apparatus 120, such as the apparatus that is depicted in FIG. 13 which will be explained later in this specification. The apparatus 120 will for convenience be referred to as a mobile terminal 120 in the following.

The operation starts at step 200. At step 201, the mobile terminal 120 collects fingerprint data. This step is described in more detail below with reference to FIG. 3. In brief, the collection of fingerprint data involves scanning for signals transmitted by access points, such as the access points 131-136, and storing information including radio parameters such as RSS information, a location of the mobile terminal 120 at the time the RSS was measured and a time at which the scan was performed.

Following step 201, at step 202 the mobile terminal 120 identifies MIMO groups. Step 202 is described below in detail with reference to FIG. 4. In brief, the identification of MIMO groups in step 202 involves processing the fingerprint data that was collected in step 201 to identify access points that are co-located and form part of a common MIMO device.

The fingerprint data collected in step 201 also includes identifiers uniquely or pseudo-uniquely identifying the transmitting access point. For instance, the identifier may be a MAC address or similar. Equally well, a node of a communication network may for instance have an identifier that is not unique (e.g. only locally unique) in the communication network, but that is at least unique in a subregion of the region covered by the communication network. The identifier of the node may for instance be a cell identifier. Examples of as cellular cell identifiers include e.g. a Mobile Country Code (MCC), a Mobile Network Code (MNC), a Local Area Code (LAC) and/or a Cell Identity (CID) in case of coverage areas of a 2G mobile communications system, a UTRAN Cell ID (UC-ID) in case of a 3G mobile communications system, or an LTE Cell Identity in case of a 4G communications system. Examples of non-cellular identifiers include identifiers of WLAN access points (e.g. a basic service set identification (BSSID), like a medium access control (MAC) identifier of a WLAN access point or a service set identifier (SSID)).

At step 203, the mobile terminal 120 consolidates fingerprints for MIMO groups that were identified in step 202. This is described below in detail in relation to FIG. 5. In brief, the mobile terminal 120 consolidates RSS data for access points 131 to 133 that have been identified as forming part of a MIMO group, thereby reducing the amount of data that is needed to represent the access points forming part of the MIMO group.

At step 204, the consolidated fingerprint data is transmitted by the mobile terminal 120. Here, the consolidated fingerprint data is transmitted to the server 140, from where it can be used to create radiomap information for use later in radiomap based positioning.

The transmission of consolidated fingerprint data may occur at any suitable time and in any suitable way. For instance, the transmission of consolidated fingerprint data 204 may occur only when the mobile terminal 120 is next connected to a Wi-Fi access point through which data can be transmitted without financial cost to the user of the mobile terminal 120.

After step 204, the operation ends at step 205.

Figure 3:
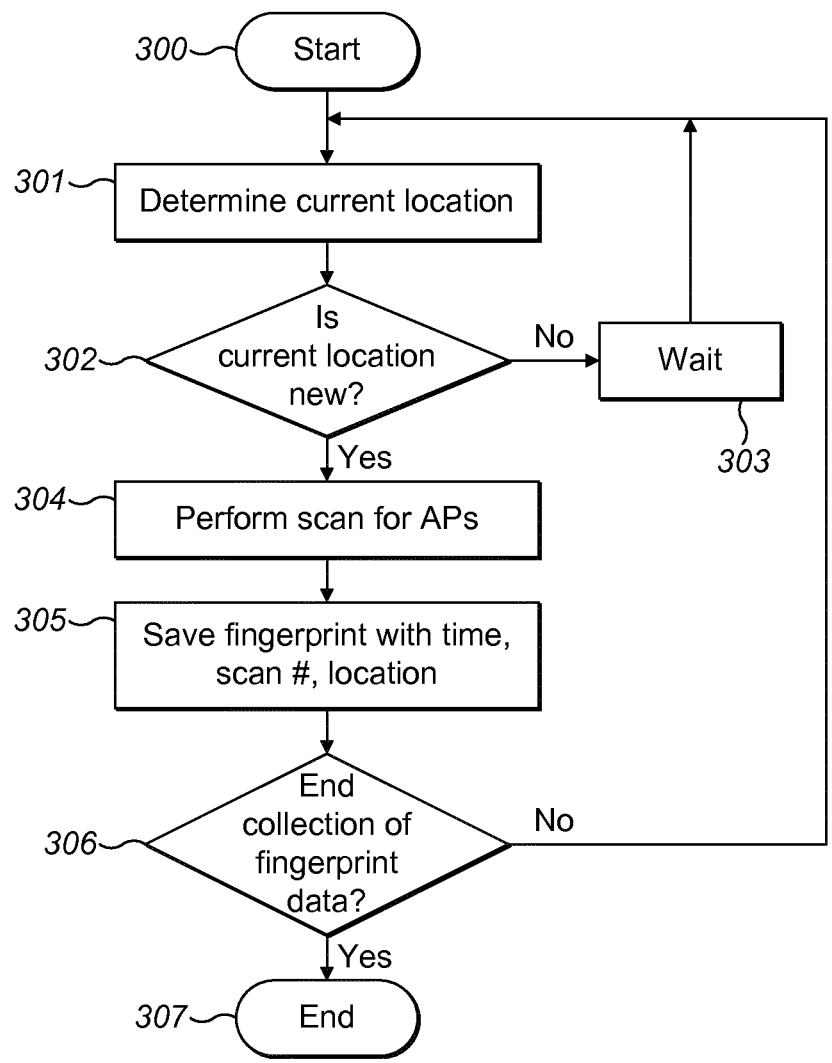
FIG. 3 is a second flow chart illustrating operation of the mobile terminal of the FIG. 1 system according to various embodiments.

The collection of fingerprint data step 201 of FIG. 2 according to various embodiments will now be described in detail with reference to FIG. 3. FIG. 3 shows steps that are performed by the mobile terminal 120.

The operation starts at step 300. At step 301, the mobile terminal 120 determines its current location. This can be performed in one of a number of different ways. For instance, the mobile terminal 120 may calculate its current location by means of received satellite signals of a GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS). Alternatively, the mobile terminal 120 may calculate its current location using an indoor positioning system, such as the HAIP (high accuracy indoor positioning) system developed by Nokia Corporation. Further alternatively, the mobile terminal 120 may calculate its current location by estimating the distance and direction moved, using gyroscopes, accelerometers and/or other internal sensors of the mobile terminal 120, from a last-known location, which may have been calculated using a satellite-based positioning system or an indoor positioning system, for instance. It is also possible that the current location is given by the user if the radio measurement data is generated by a voluntary surveyor. In this case, the location is determined by the user with reference to a map representing the layout/floor plan of the building and an input provided to the mobile terminal 120 accordingly. The mobile terminal 120 determines its current location from the user input.

After the current location of the mobile terminal 120 has been determined at step 301, it is determined at step 302 whether the current location of the mobile terminal 120 is new. A determination that the current location is new is made if the mobile terminal 120 assesses that fingerprint data for the current location has not been collected by the mobile terminal 120 within a predetermined period of time. This may involve comparing a current location to locations of already stored fingerprint data and assessing whether the difference in locations falls below a threshold, for instance between one and five meters. If the difference in locations exceeds the distance threshold and the difference in time between the current time and a time at which the corresponding earlier fingerprint data was collected falls below a time threshold, it is determined that the current location is new. The inclusion of a check in difference in time allows the mobile terminal 120 to collect data for a given location at sufficient intervals that new data is collected every now and again but not too frequently as to unnecessarily utilize resources of the mobile terminal and unnecessarily burden the server 140.

If the current location is determined at step 302 not to be new, at step 303 the mobile terminal 120 waits for a predetermined period of time before returning to step 301. If the current location is determined to be new at step 302, the operation progresses to step 304.

At step 304, a scan for access points is performed by the mobile terminal 120. Step 304 involves the mobile terminal 120 using its wireless transceiver equipment to detect and decode transmissions by access points whose transmissions are sufficiently strong to be able to be received by the mobile terminal 120. The mobile terminal 120 may perform a scan only for access points that are transmitting Wi-Fi signals (that is, signals that are transmitted in accordance with the IEEE 802.11 standard). Alternatively, the scan performed by the mobile terminal at step 304 may be performed in respect of multiple interfaces, for instance Wi-Fi, UMTS, LTE, Bluetooth, Bluetooth Low Energy, etc. The interface types for which the mobile terminal 120 is required to scan may have been set by the server 140 at an earlier time.

Following step 304, the mobile terminal 120 saves the fingerprint data at step 305. The fingerprint data that is saved at step 305 includes a time at which the scan was performed at step 304, and an identifier that constitutes a scan number (or scan #), and the location of the mobile terminal 120 at the time the scan was performed. The fingerprint also includes radio parameter data and access point identification information for each access point from which transmissions were received from the mobile terminal 120 during the scan. For instance, the fingerprint data may include an RSS value and a MAC address for each access point from which transmissions were received during the scan for access points. If there is some uncertainty about the time at which the scan was performed, an indication of the uncertainty of the time (for instance in the form of a time value by which the time measurement may deviate) may be stored as part of the fingerprint. If there is some uncertainty about the location of the mobile device at the time the scan was performed, this may be stored as part of the fingerprint information. For instance, the fingerprint may include data indicating a distance from which the actual location may deviate from the recorded location. The mobile terminal 120 may calculate the location deviation maximum value in any suitable way, and may utilise a measure of the movement of the mobile terminal 120 at the time at which the scan was performed at step 304.

At step 306, it is determined whether to end the collection of fingerprint data by the mobile terminal 120. If it is required for the mobile terminal 120 to continue collecting fingerprint data, step 306 produces a negative result and the operation returns to step 301. Here, the current location of the mobile terminal 120 is again determined.

Operation of steps 301, 302 and 303 is such that a scan for access points is performed at step 304 only when the mobile terminal 120 reaches a new location or the fingerprint data for the current location is out of date.

Once step 306 indicates that it is required to end the collection of fingerprint data by the mobile terminal 120, the operation ends at step 307.

The result of the operation of FIG. 3 is a database of fingerprints, an example of which is shown in Table 1 below.

Figure 4:
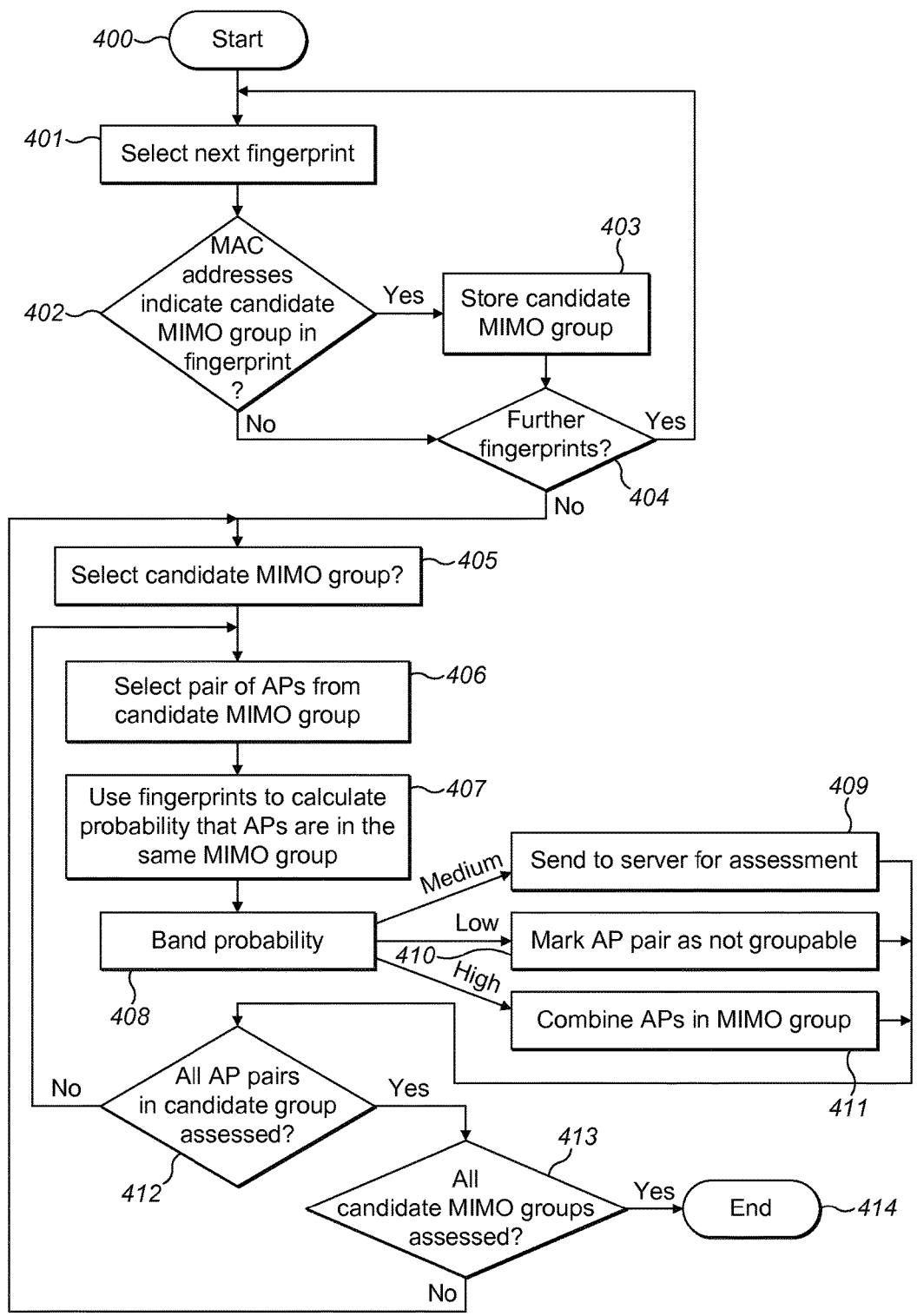
FIG. 4 is a third flow chart illustrating operation of the mobile terminal of the FIG. 1 system according to various embodiments.

The identification of MIMO groups of step 202 of FIG. 2 will now be described in detail with reference to FIG. 4. FIG. 4 shows steps that are performed by the mobile terminal 120.

The operation starts at step 400. At step 401, the next fingerprint is selected by the mobile terminal 120. On the first performance of step 401, this results in the first fingerprint being selected. On subsequent executions of step 401, different fingerprints are selected. The fingerprints here are ones that have been stored in the mobile terminal 120 following execution of the operation 300 of FIG. 3, which is shown as step 201 of FIG. 2, to collect fingerprint data by scanning for access points from which the mobile terminal 120 can receive transmissions.

Following step 401, at step 402 the mobile terminal 120 determines whether the MAC addresses the fingerprints selected at step 401 indicates that there is a candidate MIMO group or there are candidate MIMO groups in the fingerprint. This is achieved by the mobile terminal 120 comparing the MAC addresses of the access points that are included in the fingerprint with each other. Where the MAC addresses for two access points are very similar, and for instance fall within 8 or F (in hexadecimal) from one another, it is determined that the MAC addresses indicate a candidate MIMO group. Step 402 may result in a determination that there are more than two access points that are candidates for a single MIMO group, for instance because the MAC addresses of the multiple access points have values that differ by no more than 8 or F. Step 402, may also result in

TABLE 1

| Scan # | Time (date, time) | Location (lat, long, floor) | Floor uncertainty (floors) | x, y Location uncertainty (m) | AP identifier | RSS (dBm) |
|---|---|---|---|---|---|---|
| 9001 | 01.05.2014 13:28 | 51.518039, −0.097245, 008 | 0 | 0.1 | 1a:2b:3c:4d:5e | −53 |
| | | | | | 12:34:56:78:90 | −38 |
| | | | | | 00:aa:bb:cc:d0 | −38 |
| | | | | | 00:aa:bb:cc:d1 | −39 |
| | | | | | 00:aa:bb:cc:d2 | −37 |
| | | | | | 21:43:65:87:09 | −32 |
| 9002 | 01.05.2014 13:36 | 51.517990, −0.097152, 008 | 0 | 0.1 | 1a:2b:3c:4d:5e | −31 |
| | | | | | 12:34:56:78:90 | −49 |
| | | | | | 00:aa:bb:cc:d0 | −33 |
| | | | | | 00:aa:bb:cc:d1 | −33 |
| | | | | | 00:aa:bb:cc:d2 | −32 |
| | | | | | 21:43:65:87:09 | −41 |
| 9003 | 01.05.2014 13:58 | 51.517642, −0.0971314, 006 | 1 | 0.05 | 1a:2b:3c:4d:5e | −42 |
| | | | | | 00:aa:bb:cc:d0 | −43 |
| | | | | | 00:aa:bb:cc:d1 | −42 |
| | | | | | 00:aa:bb:cc:d2 | −41 |

The database shown in FIG. 1 relates to three scans (9001, 9002 and 9003) at different times and at different locations. The database only stores the location once for each scan, and only stores the time once for each scan.

On each scan, multiple access points were detected. For each access point, the identifier (e.g. MAC address) of the access point and the received signal strength (RSS) of the signals received from the access point are stored in the database. It will be seen that for scans 9001 and 9002, the same access points were detected, but two of the access points were not detected in the scan 9003.

The radio measurement values may take any suitable form. For instance, the measurement parameter may be an RSS, e.g. measured in dBm, for instance with a reference value of 1 mW, with or without the Doppler effect being averaged out therein.

a determination that there are multiple candidate MIMO groups in the fingerprint. Here, first and second access points may have MAC addresses with values that are separated by a small value and third and fourth access points may have MAC addresses that are separated by a small value but are separated from the MAC addresses of the first and second access points by a larger value.

The result of the performance of step 402 by the mobile terminal 120 is a number of candidate MIMO groups, each of which indicates multiple access points (by indicating their MAC addresses).

If one or more candidate MIMO groups are identified at step 402, the candidate MIMO groups are stored in the mobile terminal 120 at step 403. The candidate MIMO groups may be stored in any suitable way, for instance using the access point identifiers.

In the example database shown above in Table 1, three access point identifiers are separated by a small amount, and these are oo:aa:bb:cc:do, oo:aa:bb:cc:d1 and oo:aa:bb:cc:d2. All other access point identifiers are separated from each other by at least 8 or F (this is true in either case).

On a negative determination from step 402 or following step 403, at step 404 the mobile terminal 120 determines whether there are further fingerprints stored in the mobile terminal that have not yet been processed. If there are further fingerprints that are determined not to have been processed, the operation returns to step 401, where the next fingerprint is selected for processing at step 402.

Once it is determined at step 404 that there are no further fingerprints, and that candidate MIMO groups for all of the fingerprints have been identified, the operation continues to step 405. This marks the beginning of a process for validating the candidate MIMO groups.

At step 406, a pair of access points are selected from a candidate MIMO group. Next, at step 407, the mobile terminal 120 uses the fingerprints for the selected pair of access points to calculate a probability that the access points are in the same MIMO group. The probability may be calculated in any suitable way, and a number of alternatives are described below. In brief, the assessment of the probability that the access points are in the same MIMO group involves comparison of the RSS values that were recorded for the different access points at the same location (or approximately the same location) and at the same time (or approximately at the same time). A higher probability results where there is a large correlation between the RSS values for the access points (for a given time and a location). However, a large penalty is provided (reducing the probability) where one fingerprint includes a RSS value indicating a relatively strong signal from one access point and there is no RSS value for the other access point at the same time and location. The closeness of the MAC address (in terms of the difference between the values of the MAC addresses for the access points) is not used in determining the probability that the access points are in the same MIMO groups, although in other embodiments the MAC addresses may be so used.

An example equation for calculating the probability that the access points are in the same MIMO group will now be described.

RSS-fingerprints from APs i and j are considered the same (from the same MIMO group) if the average (probability) of the absolute RSS-differences among the co-located fingerprints is smaller than a pre-defined threshold dRSS_MIMO $$dRSS\_ABS=1/N \times [SUM(|RSS^i(k)-RSS^j(k)|), k=1 \ldots N] < dRSS\_MIMO$$

where
N number of co-located fingerprints for APs i and j
$RSS^i$ the kth RSS measurement for the ith AP N typically needs to be greater than 1 (e.g. more than 5).

The average can instead be calculated as the mean of squared differences, root mean square, weighted mean (which is useful where some fingerprints are considered more valuable than others) etc.

In the example of the database shown in Table 1 above, the RSS values for the access points with the MAC addresses oo:aa:bb:cc:do, oo:aa:bb:cc:d1 and oo:aa:bb:cc:d2 deviate by only small amounts on different scans. As such, step 407 results in a determination of these access points being validated as part of the same MIMO group and thus belonging to the same MIMO device.

At step 408, the probability value that was calculated in step 407, is compared to some threshold so as to determine whether the probability is relatively low, relatively high or is medium (i.e., between high and low).

At step 408 if it is determined that the probability is in the medium band, at step 409 the mobile terminal 120 sends the relevant fingerprint data to the server 140 for assessment. The step of sending at 409 the data to the server may occur substantially straight away or it may be deferred and sent to the server 140 at a later time. The effect of step 409 is the provision to the server 140 of the fingerprint information that includes data relating to the access points that were selected at points 406 such as to allow the server 140 to make a decision as to whether the access points are co-located. The sending at step 409 to the server 140 of data for assessment may be performed for the pair of access points alone, or data may be collected for multiple pairs of access points and sent at the same time to the server 140 for assessment.

If step 408 indicates a probability in the low band, at step 410 the mobile terminal 120 marks the access point pair as not groupable. This prevents the pair of access points that were selected at points 406 from being included in a MIMO group in cases where the fingerprint data indicates that they are likely not to be co-located and part of the same MIMO device.

If at step 408 the mobile terminal 120 assesses the probability to be in a high band, at step 411 the mobile terminal 120 combines the access points in a MIMO group. This involves creating a MIMO group if one does not already exist for either of the access points, or updating an existing MIMO group if one of the access points is already included in a MIMO group. The combining of the access points in the MIMO group results in the access points being considered together and (as will be explained with reference to FIG. 5) in fingerprint data for the access points being consolidated before transmission to the server 140. The combining of the access points in the MIMO group at step 411 is performed only when the mobile terminal 120 has determined that there is a high probability that the access points are co-located.

For each MIMO group, the mobile terminal 120 stores data that includes an identifier for the MIMO group, which may take any suitable form, and indicates the access points that form part of the MIMO group, for instance by way of the MAC address of the access points.

Following step 409, 410 or 411, the operation proceeds to step 412. Here, the mobile terminal 120 determines whether all of the access point pairs in the candidate group have been assessed. If there are further access point pairs in the candidate group that have not been assessed, the operation returns to step 406, where the next pair of access points from the candidate MIMO group is selected. This ensures that all possible pairs of access points from the candidate MIMO group are processed, in particular to calculate the probability that the access points are co-located and thus should be in the same MIMO group.

If at step 412 it is determined that all of the access point pairs in the candidate group have been assessed, the operation proceeds to step 413. Here, the mobile terminal 120 determines whether all candidate MIMO groups have been assessed. On a negative determination, the operation returns to step 405, where the next candidate MIMO group is selected. This ensures that each of the candidate MIMO groups is processed in turn and that each of them is processed by the mobile terminal 120. Once step 413 determines that all the candidate MIMO groups have been assessed, the operation ends at step 414.

Figure 5:
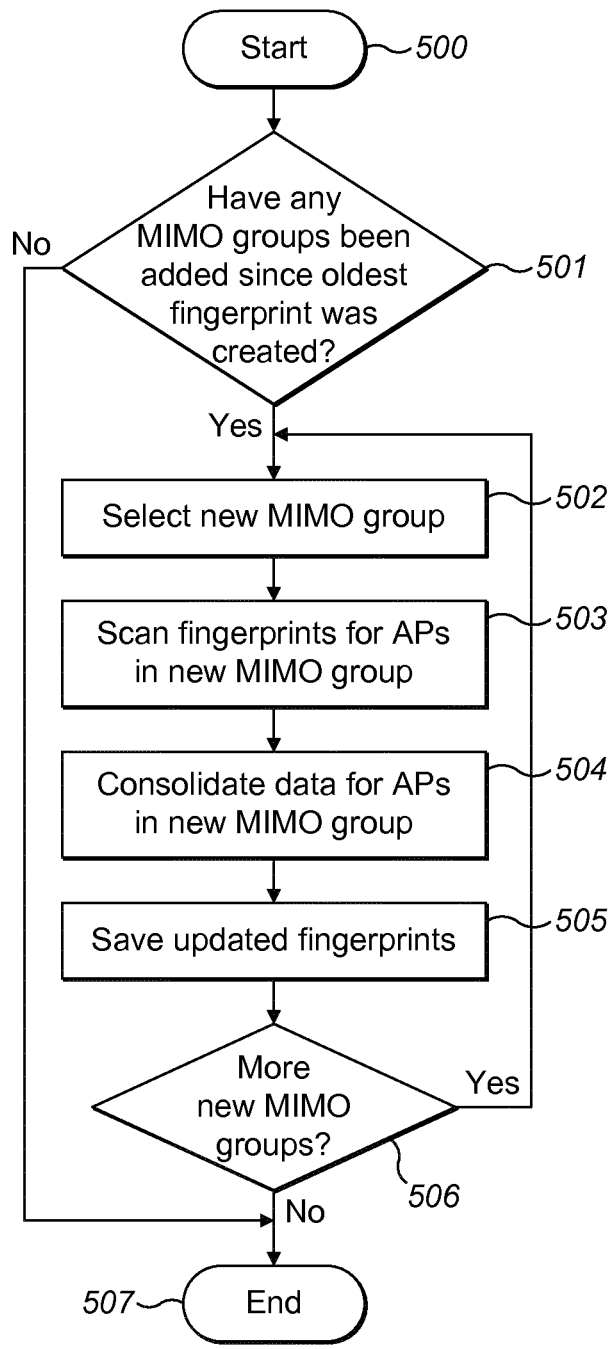
FIG. 5 is a fourth flow chart illustrating operation of the mobile terminal of the FIG. 1 system according to various embodiments.

Operation of the mobile terminal 120 in performing step 203 of FIG. 2, to consolidate fingerprints of MIMO groups, will now be described in reference to FIG. 5.

The operation begins at step 500. At step 501, the mobile terminal 120 determines whether any MIMO groups have been added since the oldest fingerprint in the fingerprint database stored in the mobile terminal 120 was created. This involves determining whether a MIMO group has been created or updated since the mobile terminal 120 started collecting fingerprints through scanning for access points, since fingerprints were last uploaded to the server 140.

After step 505, it is determined at step 506 by the mobile terminal 120 whether there are more new MIMO groups to be processed. On a positive determination, the operation returns to step 502, where a new MIMO group is selected. This causes the MIMO groups to be processed in turn.

Following a negative determination from step 506, or following a negative determination from step 501 (where the mobile terminal 120 indicates that no MIMO groups have been added since the oldest fingerprint was created) the operation ends at step 507.

For the example database shown in Table 1 above, the updated fingerprint may be as shown in Table 2 below.

TABLE 2

| Scan # | Time (date, time) | Location (lat, long, elevation) | Floor uncertainty (floors) | x, y uncertainty (m) | AP identifier | RSS (dBm) |
|---|---|---|---|---|---|---|
| 9001 | 01.05.2014 13:28 | 51.518039, −0.097245, 008 | 0 | 0.1 | 1a.:2b:3c:4d:5e | −53 |
| | | | | | 12:34:56:78:90 | −38 |
| | | | | | ff:ff:bb:cc:d1 | −38 |
| | | | | | 21:43:65:87:09 | −32 |
| 9002 | 01.05.2014 13:36 | 51.517990, −0.097152, 008 | 0 | 0.1 | 1a.:2b:3c:4d:5e | −31 |
| | | | | | 12:34:56:78:90 | −49 |
| | | | | | ff:ff:bb:cc:d1 | −33 |
| | | | | | 21:43:65:87:09 | −41 |
| 9003 | 01.05.2014 13:58 | 51.517642, −0.0971314, 006 | 1 | 0.05 | 1a.:2b:3c:4d:5e | −42 |
| | | | | | ff:ff:bb:cc:d1 | −43 |

MIMO groups may have been added or amended for instance by the mobile terminal 120 at step 411 of FIG. 4.

On a positive determination from step 501, the operation proceeds to step 502. Here, a new MIMO group is selected. The first occasion of performance of step 502 may involve selecting the first listed MIMO group that is stored in the mobile terminal 120.

At step 503, the mobile terminal 120 scans the fingerprint database that is stored in the mobile terminal 120 for access points that are listed in the new MIMO group that was selected at step 502. Any fingerprints that include the access points are noted in a suitable way.

Next, at step 504 the mobile terminal consolidates data for the access points that were identified at step 503 as being in the new MIMO group. Consolidation involves replacing of the radio parameter and identifier of data for the access points in the fingerprint with data that represents the MIMO group as a whole. In place of the identifiers for the access points, for instance, the MIMO group identifier may be included in the consolidated fingerprint. Instead of an RSS value or other data parameter for the access points, consolidated data is included in the fingerprint. For instance, the consolidated data for the MIMO group may be formed of the average (mean or median) of the radio parameter data for the access points forming part of the MIMO group. Alternatively, consolidation may involve selecting the radio parameter data of one of the access points (for instance the first one in the list, the access point having the largest or the smallest value of MAC address for instance).

At step 505, the mobile terminal 120 saves the updated fingerprints. The updated fingerprints includes the consolidated data for the access points in the MIMO group and does not include the data for the specific access points, at least not individually.

As can be seen from Table 2, for the access points of the MIMO group there is only one AP identifier, which is an identifier allocated to the MIMO group, and one RSS value, which is the average of the RSS values for the MIMO group. The identifier for the MIMO group is formulated so as to be distinguishable as a group identifier, for instance by having a value that could not be an identifier for an individual access point. In this example, the MIMO group identifier commences with 'ff:ff' and has the same length as an access point identifier, although it may be distinguishable instead by having a different (e.g. shorter) length.

In the above, it is MIMO groups that are identified by the mobile terminal 120 that are determined at step 501 to have been added. Additionally, the mobile terminal 120 may receive (for instance from the server 140) data identifying MIMO groups that have been identified externally to the mobile terminal 120. For instance, other groups may have been identified by the server 140 or by other mobile terminals. In this case, the mobile terminal 120 receives data that identifies the MIMO groups, including an identifier for the MIMO group (the identifier being unique to the MIMO group) and including identifiers relating to each of the access points that are included in the MIMO group, for instance MAC addresses for the access points. In this way, the mobile terminal 120 can consolidate fingerprint data for access points that are co-located and thus are part of a MIMO group without needing to make the determination from other data that the access points are co-located. This can reduce the processing burden on the mobile terminal 120. Additionally, since the server 140 may be able to make more reliable determinations as to whether access points are co-located (because the server 140 has access to data from other mobile terminals also), this may result in improved overall operation of the radiomap based positioning system that includes the mobile terminal 120 and the server 140.

Transmission of the fingerprint data from the mobile device 120 to the server 140 can be made substantially in the same way as for fingerprint data that has not been consolidated. However, MIMO group data, consisting of a MIMO group identifier and identifiers for the access points that form the MIMO group, is transmitted also if it has not already been communicated to the server 140. The fingerprint data that is transmitted to the server constitutes the content of the database as shown in Table 2 above. This database information constitutes a compact representation of the data to be communication to the server 140 for use in producing radio maps, and it is the compactness of the data that gives rise to the advantages of reduced memory requirements and reduced bandwidth utilisation compared to a corresponding arrangement that is absent of consolidation of fingerprint data for MIMO access points.

Figure 6:
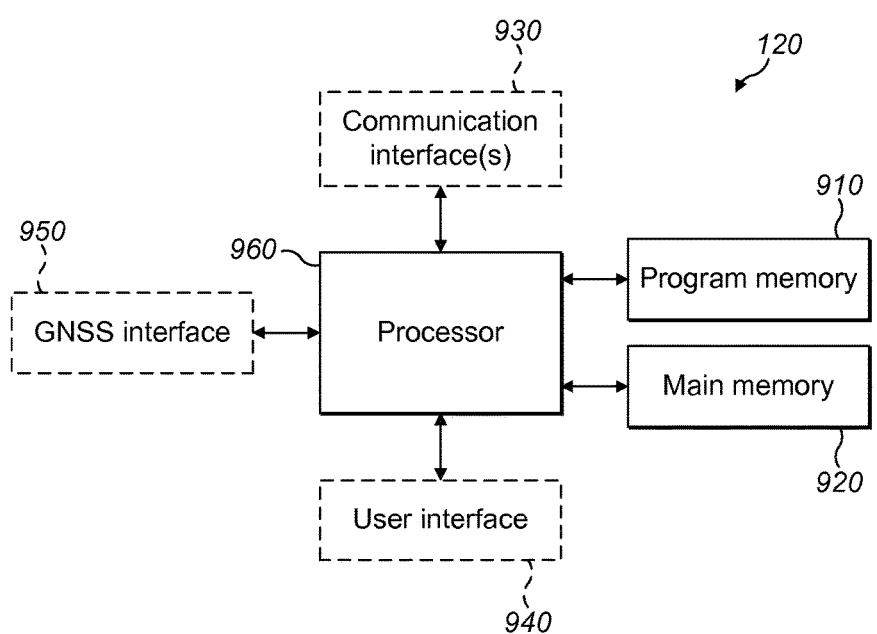
FIG. 6 is a block diagram of a details of the mobile terminal shown in FIG. 1 according to embodiment of the invention.

FIG. 6 is a schematic diagram of the apparatus 120 according to an embodiment of the invention. The apparatus 120 may for instance be or form a part (e.g. as a module or chip) of a mobile terminal such as a cellular phone, a personal digital assistant, a laptop computer, a tablet computer or a multimedia player.

Apparatus 120 comprises a processor 960. Processor 960 may represent a single processor or two or more processors, which are for instance at least partially coupled, for instance via a bus. Processor 960 executes a program code stored in program memory 910 (for instance program code causing apparatus 120 to perform one or more of the embodiments of a method according to the invention (as for instance further described above with reference to the flow charts of FIGS. 2, 3, 4 and 5), when executed on processor 960), and interfaces with a main memory 920. Some or all of memories 910 and 920 may also be included into processor 960. One of or both of memories 910 and 920 may be fixedly connected to processor 960 or at least partially removable from processor 960, for instance in the form of a memory card or stick. Program memory 910 may for instance be a non-volatile memory. Examples of such tangible storage media will be presented with respect to FIG. 7 below. It may for instance be a FLASH memory (or a part thereof), any of a ROM, PROM, EPROM and EEPROM memory (or a part thereof) or a hard disc (or a part thereof), to name but a few examples. Program memory 910 may also comprise an operating system for processor 960. Program memory 910 may for instance comprise a first memory portion that is fixedly installed in apparatus 120, and a second memory portion that is removable from apparatus 120, for instance in the form of a removable SD memory card. Main memory 920 may for instance be a volatile memory. It may for instance be a RAM or DRAM memory, to give but a few non-limiting examples. It may for instance be used as a working memory for processor 960 when executing an operating system and/or programs.

Processor 960 may further control a communication interface 930 (or several communication interfaces) configured to receive and transmit radio signals. As communication interface 930 is an optional component of apparatus 120, it is shown with dashed outlines.

For instance, the communication interface 930 may be configured to identify nodes 131, 132, 133 and 134-136 of system 100 of FIG. 1. It may in this case also be used to measure radio parameters based on signals received from the nodes, i.e. to obtain actual radio measurement values, and to send fingerprint information to the server 140 and optionally also to exchange information with server 140 of system 100 or with other mobile terminals.

The communication interface may also serve for transmitting radio measurement values and node identification information from the mobile terminal 120 to the server 140 if a position of the mobile terminal 120 is to be determined by the server 140. If position estimation is performed at the mobile terminal 120, the mobile terminal 120 may use the communication interface 930 for receiving a frequency transformed (or reconstructed) RMDS from server 120.

If the apparatus is for instance part of the server 140 of FIG. 1, the communication interface 930 may inter alia serve for receiving radio measurement values and for transmitting a position estimate or a frequency transformed (or reconstructed) RMDS.

Communication interface 930 may for instance be a wireless communication interface. Communication interface 930 may thus for instance comprise circuitry such as modulators, filters, mixers, switches and/or one or more antennas to allow transmission and/or reception of signals. Communication interface 930 may for instance be configured to allow communication in a 2G/3G/4G cellular communication network and/or a non-cellular communication network, such as for instance a WLAN network. Nevertheless, communication interface 930 may also provide wire-bound communication capabilities.

Processor 960 may further control an optional user interface 940 configured to present information to a user of apparatus 120 and/or to receive information from such a user. The user interface may allow the user to adjust settings relating to the collection and transmission of fingerprint data. The user interface may also visualize the building map that can be used by the user to manually set the reference location for the fingerprints. The user interface may for also present a position estimate to the user of the mobile terminal 120. User interface 940 may for instance be the standard user interface via which a user of apparatus 120 controls the functionality thereof, such as making phone calls, browsing the Internet, etc.

Processor 20 may further control an optional GNSS interface 950 configured to receive positioning information of an GNSS. It should be noted that, even in case apparatus 120 has a GNSS interface 950, the user of apparatus 120 (or the mobile terminal comprising apparatus 120) can still benefit from using RMDS-based positioning technologies, since these technologies may allow for significantly reduced time-to-first-fix and/or lower power consumption as compared to GNSS-based positioning. Also, and perhaps even more important, RMDS-based positioning technologies work indoors, which is generally a challenging environment for GNSS-based technologies.

The components 910-950 of apparatus 120 may for instance be connected with processor 960 by means of one or more serial and/or parallel busses.

It is to be noted that the circuitry formed by the components of apparatus 120 may be implemented in hardware alone, partially in hardware and in software, or in software only, as further described at the end of this specification.

A step performed by apparatus 120 may preferably be understood such that corresponding program code is stored in memory 910 and that the program code and the memory are configured to, with processor 960, cause apparatus 120 to perform the step. Equally well, a step performed by apparatus 120 may preferably be understood such that apparatus 120 comprises according means for performing this step.

When apparatus 120 performs a method according to the invention (e.g. a method a further described above with reference to the flow charts of FIG. 2, 3, 4, or 5) the apparatus may thus be considered as an embodiment of the invention. Likewise, the program memory 910 of apparatus 120, which may in particular be a non-transitory storage medium, may be considered as an embodiment of the invention if corresponding computer program code (for instance a set of instructions) is stored therein.

Figure 7:
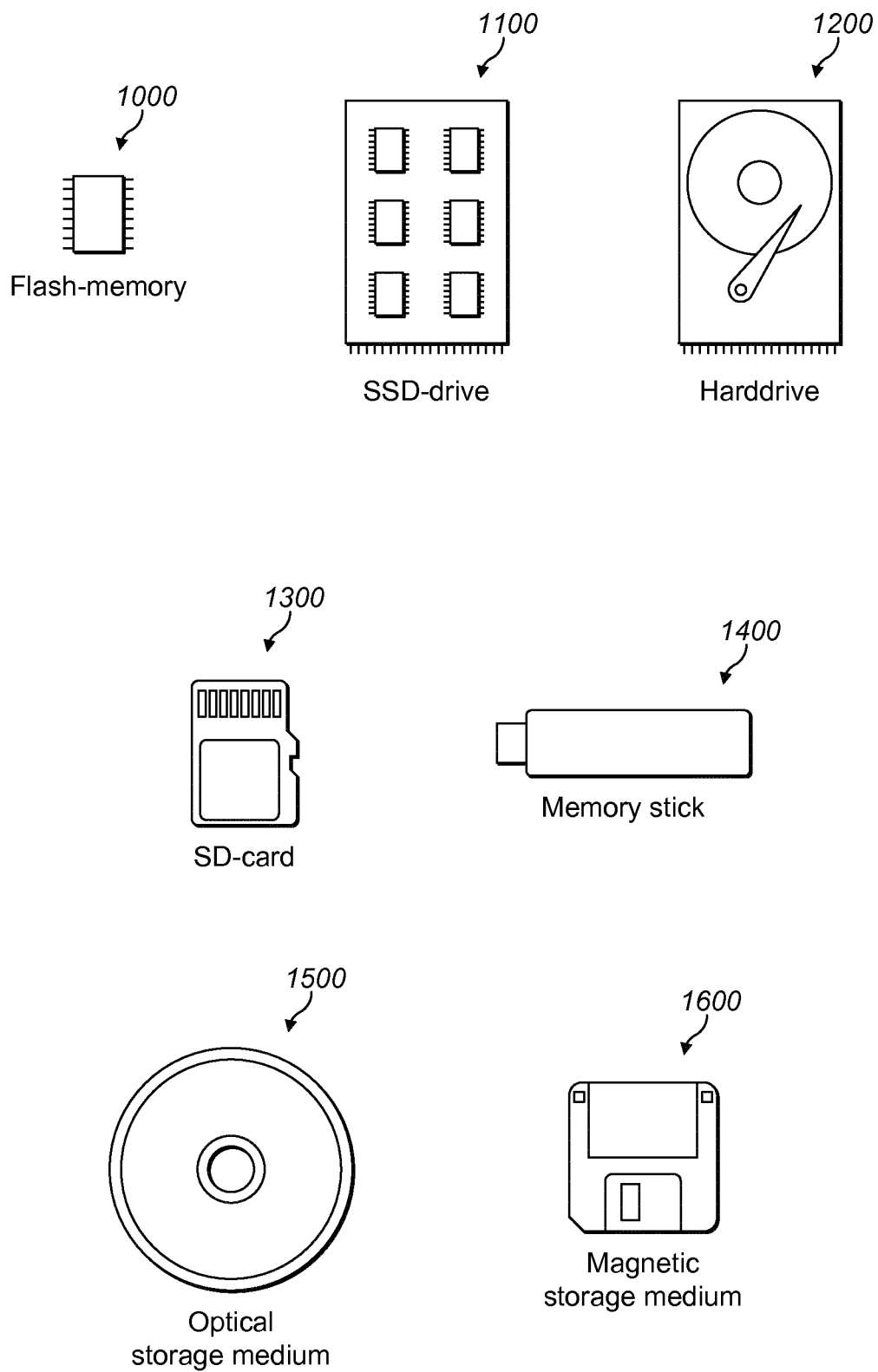
FIG. 7 is a schematic illustration of examples of tangible storage media according to embodiments of the present invention.

FIG. 7 schematically illustrates examples of tangible storage media according to the present invention that may for instance be used to implement program memory 910 of FIG. 6. To this end, FIG. 7 displays a flash memory moo, which may for instance be soldered or bonded to a printed circuit board, a solid-state drive 1100 comprising a plurality of memory chips (e.g. Flash memory chips), a magnetic hard drive 1200, a Secure Digital (SD) card 1300, a Universal Serial Bus (USB) memory stick 1400, an optical storage medium 1500 (such as for instance a CD-ROM or DVD) and a magnetic storage medium 1600.

Non-limiting examples of communication networks nodes (also denoted simply as nodes herein) are base stations (or sectors thereof) of a cellular communication network, such as for instance a second generation (2G, for instance the Global System for Mobile Communication (GSM), the General Packet Radio System (GPRS), the Enhanced Data Rates for GSM Evolution (EDGE) or the High Speed Circuit-Switched Data (HSCSD)), third generation (3G, for instance the Universal Mobile Telecommunication System, UMTS, or CDMA-2000) or fourth generation (4G, for instance the Long Term Evolution, LTE, system, the LTE Advanced (LTE-A) system or the IEEE 802.16m WiMAX system) communication network, or an AP or beacon of a non-cellular radio communication network, such as for instance a WLAN network, a Bluetooth system, a Bluetooth Low Energy system, a radio-frequency identification (RFID) system a broadcasting system such as for instance Digital Video Broadcasting (DVB), Digital Audio Broadcasting (DAB) or Frequency-Modulated (FM)/Amplitude-Modulated (AM) radio, a Near Field Communication (NFC) system, etc.). A cellular communication network may for instance be characterised by a basically seamless pavement of a geographical area (usually in the order of at least hundreds or thousands of square kilometers) with cells in which coverage is provided by respective communication network nodes that are operated by the same operator, which network may for instance support communication handover between cells. Consequently, a non-cellular communication network may be characterised as a communication network that does not have all of these properties.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analogue and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 960 of FIG. 6, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The scope of the invention is not limited by the specific embodiments described above, and various alternatives will be apparent to the skilled person. Some such variations will now be described.

Instead of recording a fingerprint when the location is new (see step 302 of FIG. 3), the recording of a fingerprint may be dependent also on the measured received signal strengths. In particular, if the received signal strengths are sufficiently the same in the current location compared to the previous records, no fingerprint is recorded. If any of the received signal strengths is different by more than a threshold amount, e.g. more than 10 dBm, then a fingerprint is recorded even though a fingerprint has been recorded previously for the same location. The use of the received signal strengths in this way may replace the use of the time difference between a current time and the time or recording an earlier fingerprint in determining whether to record a fingerprint.

In the above, the z component of the location is represented as a floor number of the building. It may alternatively be represented as a floor index, altitude (in m) either from sea level or the geometric centre of the earth, or in any other suitable way.

In the above embodiments, the identifier is used to identify candidate MIMO groups and the parameters (RSS measurements) are used to confirm the groups. In other embodiments, there is no step of identifying candidate groups. Instead, the identifiers alone may be used to determine that APs form part of the same MIMO group. This may result in incorrect grouping in some circumstances, but can be achieved easily using few processing etc. resources. Alternatively, the identifiers and the parameters may be used together to detect whether APs are part of a MIMO group. In a further alternative, the identifiers are not used in detecting MIMO groups, and instead only the radio parameters are so used. Various options for creating and then verifying (or not verifying) candidate groups will be apparent to the skilled person.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. An apparatus, the apparatus having at least one processor and at least one memory having computer-readable code stored thereon which when executed controls the at least one processor to:
   cause scanning for radio signals transmitted by at least first and second transmitting devices;
   for each radio signal identified in the scan, receive an identifier relating to the originating transmitting device from the radio signal;
   use the identifier and/or parameters of a radio signal received from the first transmitting device and the identifier and/or parameters of a radio signal received from the second transmitting device to detect whether the first and second transmitting devices are co-located including use of some information relating to the first transmitting device and some information relating to the second transmitting device to determine a candidate group for the first and second transmission devices and use of other information relating to the first transmitting device and other information relating to the second transmitting device to confirm the candidate group; and
   in response to detecting that the first and second transmitting devices are co-located:
      create a group for the transmitting devices that are identified as being co-located;
      store group identification information comprising a group identifier and identifiers for transmitting devices that are part of the group;
      create wireless fingerprint data for the group as a whole and refrain from creating wireless fingerprint data for every transmitting device of the group, wherein wireless fingerprint data is created for the group identified by the group identification information by using the group identification information that is stored; and
      cause transmission of the wireless fingerprint data to a remote server.

2. Apparatus as claimed in claim 1, wherein the computer-readable code when executed controls the at least one processor to use the identifier and the parameters of the radio signal received from the first transmitting device and to use the identifier and the parameters of the radio signal received from the second transmitting device to detect whether the first and second transmitting devices are co-located.

3. Apparatus as claimed in claim 1, wherein the computer-readable code when executed controls the at least one processor to cause transmission of the group identification information comprising the group identifier and identifiers for transmitting devices that are part of the group.

4. Apparatus as claimed in claim 1, wherein the computer-readable code when executed controls the at least one processor to receive the group identification information and to store the received group identification information in the apparatus.

5. Apparatus as claimed in claim 1, wherein the wireless fingerprint data comprises radio parameter information that is generated by averaging measured radio parameter information relating to the transmitting devices that are part of the group.

6. Apparatus as claimed in claim 1, wherein the parameter of the received radio signal is received signal strength.

7. Apparatus as claimed in claim 1, wherein the computer-readable code when executed controls the at least one processor to determine that third and fourth transmission devices may be co-located and in response to send information relating to the third and fourth transmission devices to a remote server for verification as to whether the third and fourth transmission devices are co-located.

8. A method comprising:
   scanning for radio signals transmitted by at least first and second transmitting devices;
   for each radio signal identified in the scan, receiving an identifier relating to the originating transmitting device from the radio signal;
   using the identifier and/or parameters of a radio signal received from the first transmitting device and the identifier and/or parameters of a radio signal received from the second transmitting device to detect whether the first and second transmitting devices are co-located including using some information relating to the first transmitting device and some information relating to the second transmitting device to determine a candidate group for the first and second transmission devices and using other information relating to the first transmitting device and other information relating to the second transmitting device to confirm the candidate group; and
   in response to detecting that the first and second transmitting devices are co-located:
      creating a group for the transmitting devices that are identified as being co-located;
      storing group identification information comprising a group identifier and identifiers for transmitting devices that are part of the group;
      creating wireless fingerprint data for the group as a whole and refrain from creating wireless fingerprint data for every transmitting device of the group, wherein wireless fingerprint data is created by at least one processor for the group identified by the group identification information by using the group identification information that is stored; and
      causing transmission of the wireless fingerprint data to a remote server.

9. A method as claimed in claim 8, comprising using the identifier and the parameters of the radio signal received from the first transmitting device and using the identifier and the parameters of the radio signal received from the second transmitting device to detect whether the first and second transmitting devices are co-located.

10. A method as claimed in claim 8, comprising causing transmission of the group identification information comprising the group identifier and identifiers for transmitting devices that are part of the group.

11. A method as claimed in claim 8, wherein the wireless fingerprint data comprises radio parameter information that is generated by averaging measured radio parameter information relating to the transmitting devices that are part of the group.

12. A method as claimed in claim 8, wherein the parameter of the received radio signal is received signal strength.

13. A method as claimed in claim 8, comprising determining that third and fourth transmission devices may be co-located and in response sending information relating to the third and fourth transmission devices to a remote server for verification as to whether the third and fourth transmission devices are co-located.

14. A non-transitory computer-readable storage medium having stored thereon computer-readable code, which, when executed by computing apparatus, causes the computing apparatus to perform a method comprising:
- scanning for radio signals transmitted by at least first and second transmitting devices;
- for each radio signal identified in the scan, receiving an identifier relating to the originating transmitting device from the radio signal;
- using the identifier and/or parameters of a radio signal received from the first transmitting device and the identifier and/or parameters of a radio signal received from the second transmitting device to detect whether the first and second transmitting devices are co-located including using some information relating to the first transmitting device and some information relating to the second transmitting device to determine a candidate group for the first and second transmission devices and using other information relating to the first transmitting device and other information relating to the second transmitting device to confirm the candidate group; and
- in response to detecting that the first and second transmitting devices are co-located:
  - creating a group for the transmitting devices that are identified as being co-located;
  - storing group identification information comprising a group identifier and identifiers for transmitting devices that are part of the group;
  - creating wireless fingerprint data for the group as a whole and refrain from creating wireless fingerprint data for every transmitting device of the group, wherein wireless fingerprint data is created for the group identified by the group identification information by using the group identification information that is stored; and
  - causing transmission of the wireless fingerprint data to a remote server.

* * * * *